US006499020B1

(12) United States Patent
Dolan et al.

(10) Patent No.: US 6,499,020 B1
(45) Date of Patent: Dec. 24, 2002

(54) METHOD AND DEVICE FOR IMPROVING THE EFFICIENCY OF A POSTAGE METER

(75) Inventors: Donald T. Dolan, Ridgefield, CT (US); Yakup J. Igval, Milford, CT (US); Gary S. Jacobson, Norwalk, CT (US); Wesley A. Kirschner, Hamden, CT (US); Norman R. Lilly, Monroe, CT (US); Roger J. Ratzenberger, Jr., Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/327,078

(22) Filed: Jun. 7, 1999

(51) Int. Cl.[7] ................................................ G06F 17/00
(52) U.S. Cl. ........................................................ 705/406
(58) Field of Search ................................ 705/401, 408, 705/410, 406

(56) References Cited

U.S. PATENT DOCUMENTS 4,787,311 A 11/1988 Mol ........................... 101/232
5,178,224 A * 1/1993 DiGiulio et al. ............ 705/408
5,339,100 A * 8/1994 Mistyurik ................... 346/134
5,465,662 A 11/1995 Keung et al. ............... 101/235
5,560,595 A 10/1996 Kulpa et al. ................... 271/2
5,794,223 A * 8/1998 Gallagher et al. .......... 705/408
5,813,327 A 9/1998 Freeman et al. .............. 101/93

FOREIGN PATENT DOCUMENTS

JP 408292846 A * 11/1996

OTHER PUBLICATIONS

Derwent–Acc–No:2002–197445, Elliot, J N.*

* cited by examiner

*Primary Examiner*—James P. Trammell
*Assistant Examiner*—Pierre E. Elisca
(74) *Attorney, Agent, or Firm*—Brian A. Lemm; Angelo N. Chaclas; Charles R. Malandra, Jr.

(57) ABSTRACT

A method and device for improving the efficiency of a postage meter by using a sensing to detect the edges of an incoming envelope in order to initiate a multi-speed profile for transporting the envelope with different speeds through the postage meter. With the multi-speed profile, the postage meter is allowed to have sufficient time to process mail related data and provide mail related data to a print head before the envelope reaches a print zone where the print head starts printing an indicia on the envelope.

17 Claims, 7 Drawing Sheets

| TIME SEC | TOT. TIME MSEC | VELOCITY MM/SEC | DISTANCE MM | ACCELERATION MM/S2 | COMMENT |
|---|---|---|---|---|---|
| 0.000 | 0 | 254 | 0.0 | 0 | ENVELOPE INPUT |
| 0.083 | 83 | 254 | 21.0 | 0 | LE@ S2 |
| 0.047 | 129 | 254 | 11.8 | 0 | LE @ DWELL POINT |
| 0.031 | 160 | 0 | 3.9 | -8180 | DECELERATE TRANSPORT |
| 0.100 | 260 | 0 | 0.0 | 0 | STOP |
| 0.062 | 322 | 508 | 15.8 | 8180 | ACCELERATE TRANSPORT |
| 0.015 | 337 | 508 | 7.5 | 0 | START PRINT |
| 0.250 | 587 | 508 | 127.0 | 0 | FINISH PRINT |
| 0.148 | 735 | 508 | 75.3 | 0 | TE @ S2 |
| 0.077 | 812 | 508 | 39.0 | 0 | TE @ PH |
| 0.085 | 897 | 508 | 43.0 | 0 | EJECT COMPLETE |
| 0.031 | 928 | 254 | 11.8 | -8180 | DECELERATE TRANSPORT |

| REQUIREMENTS: | | NEED: | ACTUAL |
|---|---|---|---|
| 1 TOTAL CYCLE TIME < | MS | 923 | 928 NOT OK |
| 2 CALCULATION TIME > | MS | 200 | 208 OK |
| 3 TRANSPORT SETTLE TIME @ PRINT SPEED > | MS | 10 | 15 OK |
| 4 DECELERATION TIME < TIME TO GET TO S2 | SEC | 31 | 83 OK |
| THROUGHPUT: | | 65 LPM | |
| TRANSPORT PROPERTIES: | | | |
| INPUT ROLLER TO S2: | | | 21.0 MM |
| S2 TO PRINT HEAD: | | | 39.0 MM |
| PRINT HEAD TO END OF TRANSPORT: | | | 43.0 MM |
| ENVELOPE & IMAGE PROPERTIES: | | | |
| ENVELOPE LENGTH: | | | 241.3 MM |
| PRINT LENGTH: | | | 127.0 MM |
| ASSUMES RIGHT MARGIN DISTANCE IS: | | | 0.0 MM |

SPARK 2 SINGLE ENV.

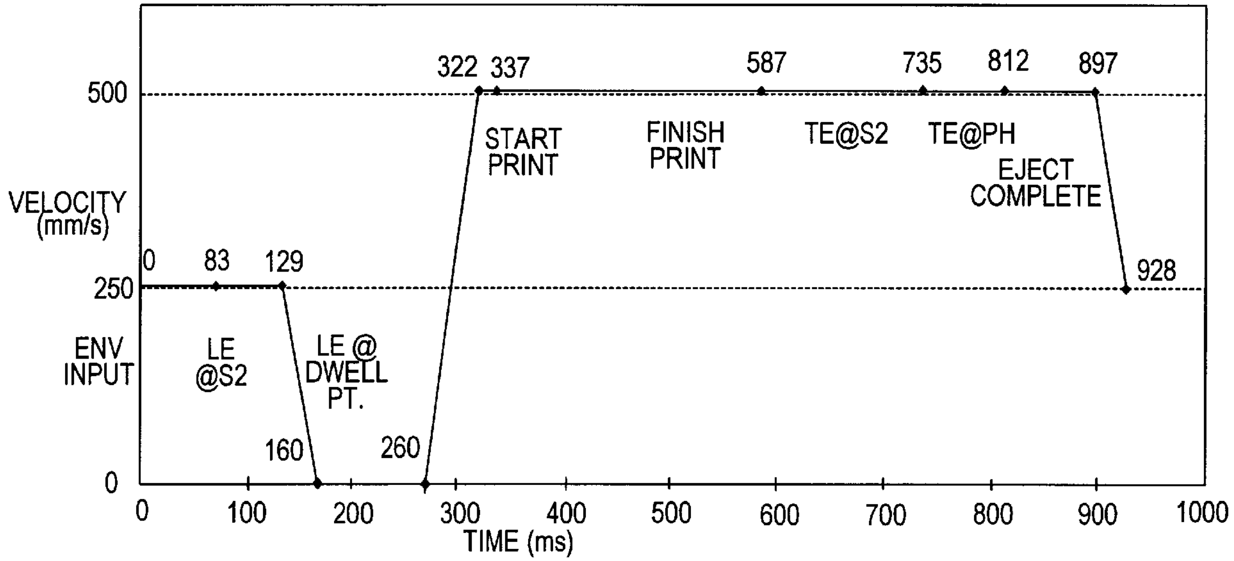

FIG .3

| TIME SEC | TOT. TIME MSEC | VELOCITY MM/SEC | DISTANCE MM | ACCELERATION $MM/S^2$ | COMMENT |
|---|---|---|---|---|---|
| 0.000 | 0 | 254 | 0.0 | 0 | ENVELOPE INPUT |
| 0.083 | 83 | 254 | 21.0 | 0 | LE@ S2 |
| 0.047 | 129 | 254 | 11.8 | 0 | LE @ DWELL POINT |
| 0.031 | 160 | 0 | 3.9 | -8180 | DECELERATE TRANSPORT |
| 0.400 | 560 | 0 | 0.0 | 0 | STOP |
| 0.062 | 622 | 508 | 15.8 | 8180 | ACCELERATE TRANSPORT |
| 0.015 | 637 | 508 | 7.5 | 0 | START PRINT |
| 0.250 | 887 | 508 | 127.0 | 0 | FINISH PRINT |
| 0.148 | 1035 | 508 | 75.3 | 0 | TE @ S2 |
| 0.077 | 1112 | 508 | 39.0 | 0 | TE @ PH |
| 0.085 | 1197 | 508 | 43.0 | 0 | EJECT COMPLETE |
| 0.031 | 1228 | 254 | 11.8 | -8180 | DECELERATE TRANSPORT |

| REQUIREMENTS: | | NEED: | ACTUAL |
|---|---|---|---|
| 1 TOTAL CYCLE TIME < | MS | 1500 | 1228 OK |
| 2 CALCULATION TIME > | MS | 200 | 508 OK |
| 3 TRANSPORT SETTLE TIME @ PRINT SPEED > | MS | 10 | 15 OK |
| 4 DECELERATION TIME < TIME TO GET TO S2 | SEC | 31 | 83 OK |
| THROUGHPUT: | | 49 LPM | |
| **TRANSPORT PROPERTIES:** | | | |
| INPUT ROLLER TO S2: | | | 21.0 MM |
| S2 TO PRINT HEAD: | | | 39.0 MM |
| PRINT HEAD TO END OF TRANSPORT: | | | 43.0 MM |
| **ENVELOPE & IMAGE PROPERTIES:** | | | |
| ENVELOPE LENGTH: | | | 241.3 MM |
| PRINT LENGTH: | | | 127.0 MM |
| ASSUMES RIGHT MARGIN DISTANCE IS: | | | 0.0 MM |

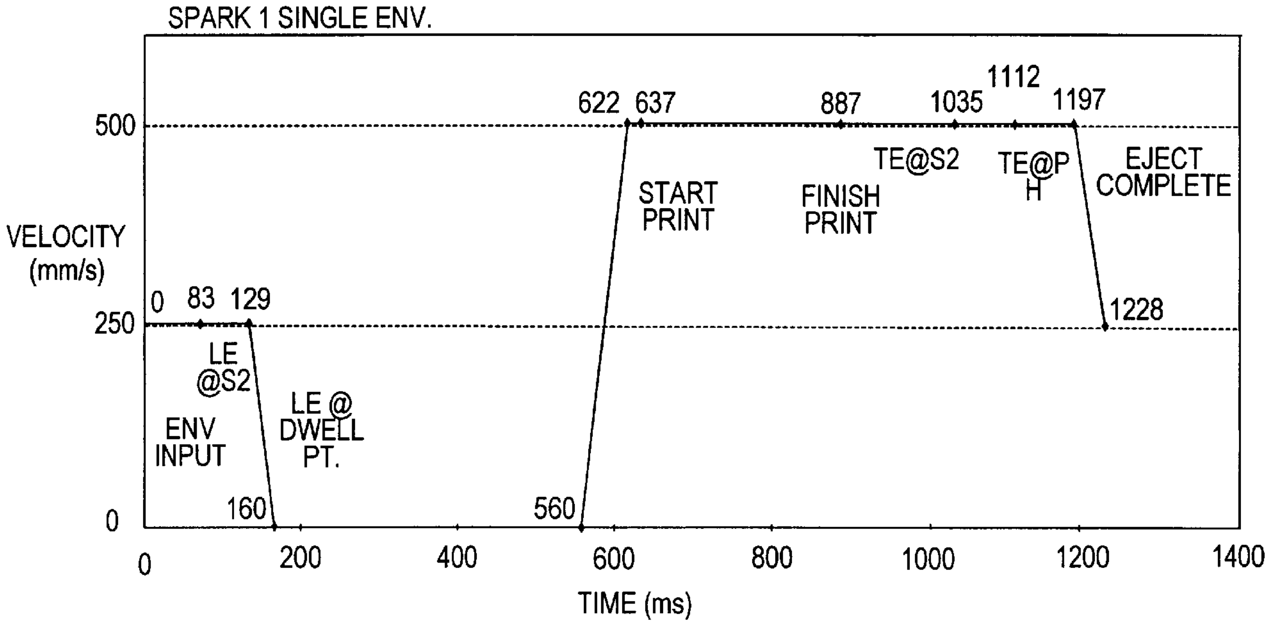

FIG. 4

| TIME SEC | TOT. TIME MSEC | VELOCITY MM/SEC | DISTANCE MM | ACCELERATION MM/S² | COMMENT |
|---|---|---|---|---|---|
| 0.000 | 0 | 508 | 0.0 | 0 | ENVELOPE INPUT |
| 0.041 | 41 | 508 | 21.0 | 0 | LE@ S2 |
| 0.062 | 103 | 0 | 15.8 | -8180 | DECELERATE TRANSPORT |
| 0.100 | 203 | 0 | 0.0 | 0 | STOP |
| 0.062 | 266 | 508 | 15.8 | 8180 | ACCELERATE TRANSPORT |
| 0.015 | 280 | 508 | 7.5 | 0 | START PRINT |
| 0.250 | 530 | 508 | 127.0 | 0 | FINISH PRINT |
| 0.148 | 678 | 508 | 75.3 | 0 | TE @ S2 |
| 0.077 | 755 | 508 | 39.0 | 0 | TE @ PH |
| 0.062 | 817 | 0 | 15.8 | -8180 | DECELERATE TRANSPORT |
| 0.100 | 917 | 0 | 0.0 | 0 | STOP |
| 0.062 | 979 | 508 | 15.8 | 8180 | ACCELERATE TRANSPORT |
| 0.015 | 994 | 508 | 7.5 | 0 | START PRINT |
| 0.008 | 1002 | 508 | 4.0 | 0 | EJECT 1ST ENVELOPE |
| 0.242 | 1244 | 508 | 123.0 | 0 | FINISH PRINT |
| 0.148 | 1392 | 508 | 75.3 | 0 | TE @ S2 |
| 0.077 | 1469 | 508 | 39.0 | 0 | TE @ PH |
| 0.062 | 1531 | 0 | 15.8 | -8180 | DECELERATE TRANSPORT |
| 0.100 | 1631 | 0 | 0.0 | 0 | STOP |
| 0.062 | 1693 | 508 | 15.8 | •8180 | ACCELERATE TRANSPORT |
| 0.023 | 1716 | 508 | 11.5 | 0 | EJECT 2ND ENVELOPE |

| REQUIREMENTS: | | NEED: | ACTUAL |
|---|---|---|---|
| 1 TOTAL CYCLE TIME < | MS | 923 | 714 OK |
| 2 CALCULATION TIME > | MS | 200 | 239 OK |
| 3 TRANSPORT SETTLE TIME @ PRINT SPEED > | MS | 10 | 15 OK |
| THROUGHPUT: | | 84 LPM | |
| CYCLE OVERLAP: | MS | 288 | |

| TRANSPORT PROPERTIES: | |
|---|---|
| INPUT ROLLER TO S2: | 21.0 MM |
| S2 TO PRINT HEAD: | 39.0 MM |
| PRINT HEAD TO END OF TRANSPORT: | 43.0 MM |
| ENVELOPE & IMAGE PROPERTIES: | |
| ENVELOPE LENGTH: | 241.3 MM |
| PRINT LENGTH: | 127.0 MM |
| ASSUMES RIGHT MARGIN DISTANCE IS: | 0.0 MM |
| ASSUMES GAP BETWEEN ENVELOPES IS: | 39.0 MM |

SPARK 2 HIGH SPEED INPUT

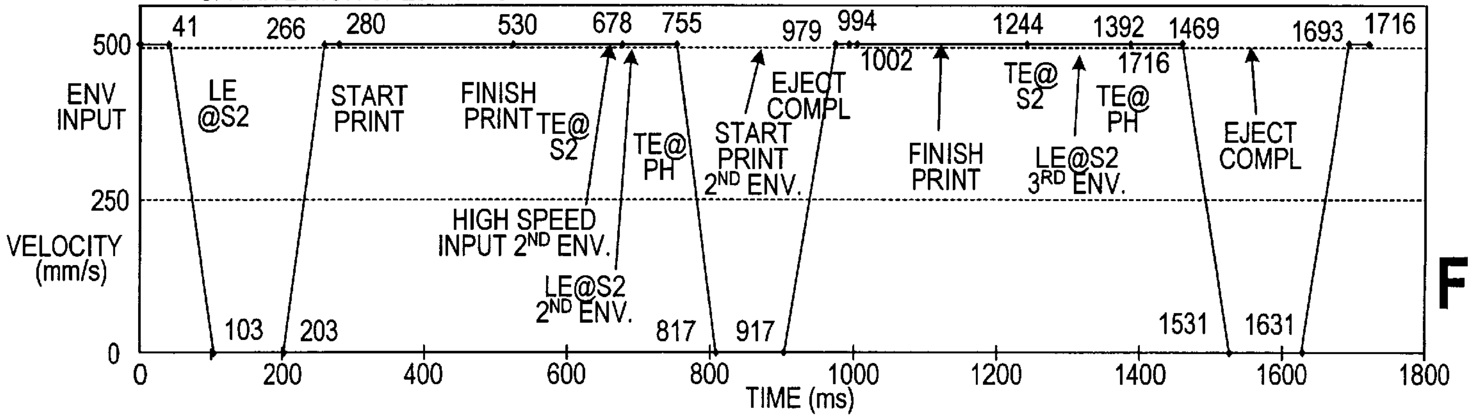

FIG. 5

| TIME SEC | TOT. TIME MSEC | VELOCITY MM/SEC | DISTANCE MM | ACCELERATION MM/S² | COMMENT |
|---|---|---|---|---|---|
| 0.000 | 0 | 508 | 0.0 | 0 | ENVELOPE INPUT |
| 0.041 | 41 | 508 | 21.0 | 0 | LE@ S2 |
| 0.062 | 103 | 0 | 15.8 | -8180 | DECELERATE TRANSPORT |
| 0.400 | 503 | 0 | 0.0 | 0 | STOP |
| 0.062 | 566 | 508 | 15.8 | 8180 | ACCELERATE TRANSPORT |
| 0.015 | 580 | 508 | 7.5 | 0 | START PRINT |
| 0.250 | 830 | 508 | 127.0 | 0 | FINISH PRINT |
| 0.148 | 978 | 508 | 75.3 | 0 | TE @ S2 |
| 0.077 | 1055 | 508 | 39.0 | 0 | TE @ PH |
| 0.062 | 1117 | 0 | 15.8 | -8180 | DECELERATE TRANSPORT |
| 0.400 | 1517 | 0 | 0.0 | 0 | STOP |
| 0.062 | 1579 | 508 | 15.8 | 8180 | ACCELERATE TRANSPORT |
| 0.015 | 1594 | 508 | 7.5 | 0 | START PRINT |
| 0.008 | 1602 | 508 | 4.0 | 0 | EJECT 1ST ENVELOPE |
| 0.242 | 1844 | 508 | 123.0 | 0 | FINISH PRINT |
| 0.148 | 1992 | 508 | 75.3 | 0 | TE @ S2 |
| 0.077 | 2069 | 508 | 39.0 | 0 | TE @ PH |
| 0.062 | 2131 | 0 | 15.8 | -8180 | DECELERATE TRANSPORT |
| 0.400 | 2531 | 0 | 0.0 | 0 | STOP |
| 0.062 | 2593 | 508 | 15.8 | 8180 | ACCELERATE TRANSPORT |
| 0.023 | 2616 | 508 | 11.5 | 0 | EJECT 2ND ENVELOPE |

| REQUIREMENTS: | | NEED: | ACTUAL |
|---|---|---|---|
| 1 TOTAL CYCLE TIME < | MS | 1500 | 1014 OK |
| 2 CALCULATION TIME > | MS | 200 | 539 OK |
| 3 TRANSPORT SETTLE TIME @ PRINT SPEED > | MS | 10 | 15 OK |
| THROUGHPUT: | | 59 LPM | |
| CYCLE OVERLAP: | MS | 588 | |

| TRANSPORT PROPERTIES: | |
|---|---|
| INPUT ROLLER TO S2: | 21.0 MM |
| S2 TO PRINT HEAD: | 39.0 MM |
| PRINT HEAD TO END OF TRANSPORT: | 43.0 MM |
| **ENVELOPE & IMAGE PROPERTIES:** | |
| ENVELOPE LENGTH: | 241.3 MM |
| PRINT LENGTH: | 127.0 MM |
| ASSUMES RIGHT MARGIN DISTANCE IS: | 0.0 MM |
| ASSUMES GAP BETWEEN ENVELOPES IS: | 39.0 MM |

SPARK 1 HIGH SPEED INPUT

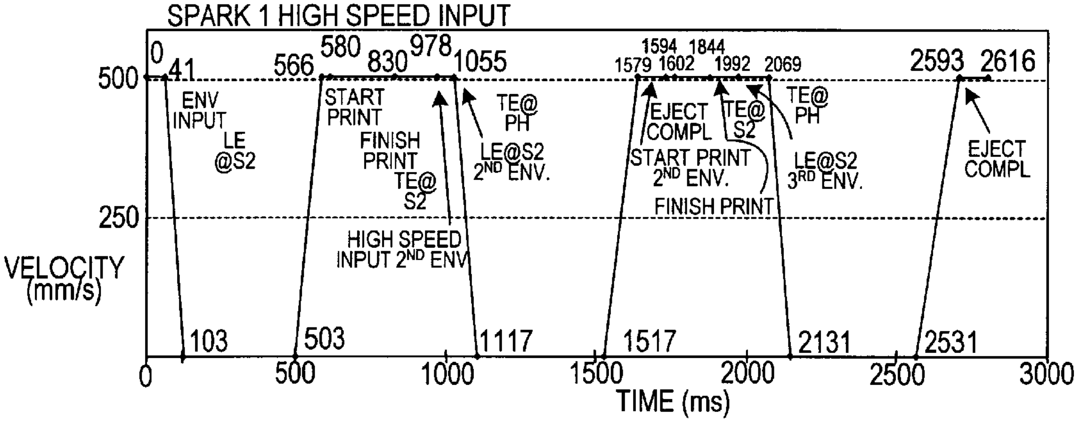

FIG. 6

| TIME SEC | TOT. TIME MSEC | TAPE VEL. MM/SEC | XPORT VEL. MM/SEC | TAPE ACCEL. MM/S² | XPORT ACCEL. MM/S² | DIST. MM | COMMENT |
|---|---|---|---|---|---|---|---|
| 0.000 | 0 | 0 | 0 | 0 | 0 | 0.0 | |
| 0.028 | 28 | 230 | 230 | 8180 | 8180 | 3.2 | ACCELERATE TAPE |
| 0.003 | 31 | 230 | 254 | 0 | 8180 | 0.7 | ACCELERATE XPORT |
| 0.403 | 434 | 230 | 254 | 0 | 0 | 92.6 | SLEW |
| 0.000 | 434 | 230 | 254 | 0 | 0 | 0.0 | HANDOFF TO TRANS |
| 0.083 | 516 | 230 | 254 | 0 | 0 | 21.0 | LE @ S2 |
| 0.028 | 545 | 0 | 24 | -8180 | -8180 | 3.9 | DECEL TAPE |
| 0.003 | 547 | 0 | 0 | 0 | -8180 | 0.0 | DECEL TRANS |
| 0.200 | 745 | 0 | 0 | 0 | 0 | 0.0 | STOP |
| 0.062 | 807 | 508 | 508 | 8180 | 8180 | 15.8 | ACCEL TRANS & TAPE |
| 0.038 | 845 | 508 | 508 | 0 | 0 | 19.3 | START PRINT |
| 0.062 | 907 | 0 | 508 | -8180 | 0 | 31.5 | DECEL TAPE |
| 0.161 | 1068 | 0 | 508 | 0 | 0 | 81.8 | TE @ S2 |
| 0.028 | 1096 | 230 | 508 | 8180 | 0 | 14.3 | ACCEL TAPE |
| 0.049 | 1145 | 230 | 508 | 0 | 0 | 24.7 | TE @ PH |
| 0.085 | 1229 | 230 | 508 | 0 | 0 | 43.0 | EJECT COMPLETE |
| 0.031 | 1260 | 230 | 254 | 0 | -8180 | | DECELERATE TRANS |
| 0.241 | 1502 | 230 | 254 | 0 | 0 | | SLEW |
| 0.000 | 1502 | 230 | 254 | 0 | 0 | | HANDOFF TO TRANS |
| 0.083 | 1584 | 230 | 254 | 0 | 0 | | LE @S2 |
| 0.028 | 1612 | 0 | 24 | -8180 | -8180 | 3.9 | DECEL TAPE |
| 0.003 | 1615 | 0 | 0 | 0 | -8180 | 0.0 | DECEL TRANS |

| REQUIREMENTS: | | NEED: | ACTUAL |
|---|---|---|---|
| 1 TOTAL CYCLE TIME < | MS | 1200 | 1068 OK |
| 2 CALCULATION TIME > | MS | 200 | 328 OK |
| 3 TRANSPORT SETTLE TIME @ PRINT SPEED > | MS | 10 | 38 OK |
| 4 TAPE GAP @ TAPE MOTOR START > | MM | 0 | 117.5 OK |
| TAPE CYCLE OVERLAP: | MS | 545 | |
| NEXT TAPE CYCLE: | MS | 1068 | |
| TAPE THROUGHPUT: | TAPES/MIN | 56 | |

TRANSPORT PROPERTIES:
TAPE LE TO INPUT ROLLER: 96.5 MM
INPUT ROLLER TO S2: 21.0 MM
S2 TO PRINT HEAD: 39.0 MM
PRINT HEAD TO END OF TRANSPORT: 43.0 MM

TAPE & IMAGE PROPERTIES:
TAPE LENGTH: 152.4 MM
PRINT LENGTH: 127.0 MM

MOTOR PROPERTIES:
TIME TO ACCELERATE XPORT: 0.031 MSEC
TIME TO ACCELERATE TAPE: 0.028 MSEC
TAPE MOTOR DUTY CYCLE: 66%

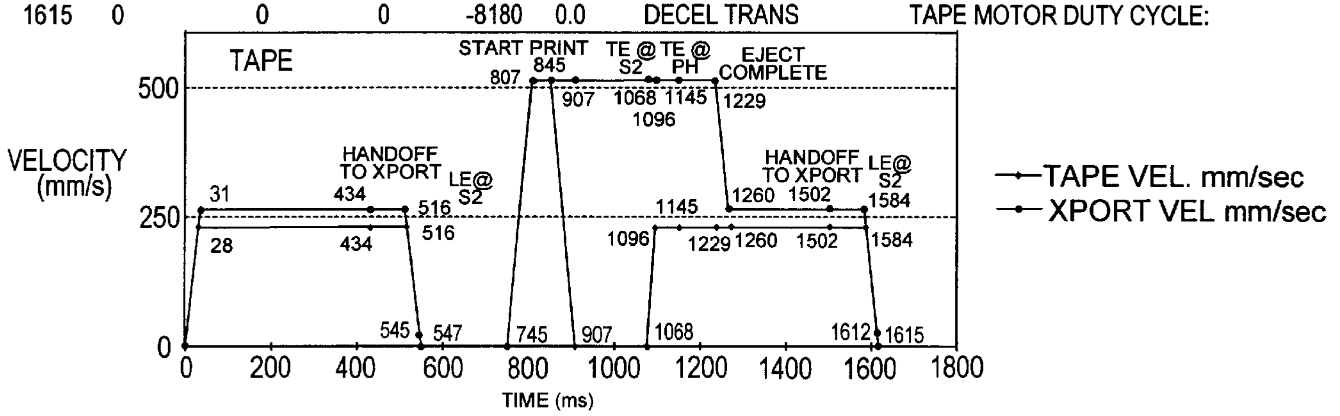

FIG. 7

METHOD AND DEVICE FOR IMPROVING THE EFFICIENCY OF A POSTAGE METER

TECHNICAL FIELD

The present invention relates to an envelope transport unit in a postage meter.

BACKGROUND OF THE INVENTION

In a postage meter, a print head is used to produce a postal indicia on an envelope when the envelope is in the print zone. In general, prior to the printing of the indicia, the postage meter must gather postage and other mail related information in order to generate print data necessary to produce the indicia.

A postage meter has to complete a single transaction each time an envelope is processed, and as such it is a real-time system. In general, a transaction includes the following tasks:

1) collection of the parameters of the transaction—Date, postage data, and other pertinent information, such as piece count, postage meter number, originating zip code, etc. must be retrieved from the meter stored memory;

2) generation of tokens—An encryption process is used to generate encrypted numbers, or tokens, that are unique to each single real-time transaction. Two sets of tokens, for example, are generated from the indicia data: one related to a vendor encryption key and one related to a U.S. Post Office encryption key;

3) message preparation—An encrypted signed message is prepared for transmission to the print head that ties together with encryption, all of the information to be contained within the indicia;

4) message transmission—The encrypted message is sent to the print head for printing after its authenticity has been verified; and 5) data loading—Once the data has been verified, it must be loaded into the registers of a Draw on the Fly (DOF) ASIC prior to printing. These registers determine the location and content of the printed information within the indicia.

All of the above-mentioned steps, which make up the transaction, take time to complete. Depending on the processing electronics in the postage meter, this transaction time is typically on the order of 200 to 500 msec. But it may be shorter or longer depending upon the particular type of processing electronics being employed and variances any concurrent demands on the processing electronics.

Postage meter customers typically evaluate many factors in making their purchasing decisions. One factor is throughput. It is desirable for the postage meter to be able to process envelopes at a sufficiently high rate to meet the mailing requirements of the customer. Another factor is size. Since desk office space is at a premium, it is desirable for the postage meter to be as small as possible. Yet another factor is cost. To be competitive in the market, the postage meter must be cost effective in view of other payment systems (permit, stamp, private carrier invoicing, etc.). With respect to lower volume mailers, these factors become even more significant.

A significant factor contributing to the size of the postage meter is the length of the envelope transport system. In a lower volume postage meter where the total transport length for the envelope to be transported from the input end of the postage meter to the print zone is reduced, and the envelope speed in the print zone is about 20 in/sec, the transaction time of 200 to 500 msec may cause a problem. If the envelope is transported through the metering system at a speed of 20 in/sec, then it takes only 125 msec for the envelope to travel from the input end to the print zone. This means that there is insufficient time for the processing electronics to complete the transaction before the envelope reaches the print zone.

One solution to this problem is to reduce the speed by approximately one half thereby allowing the processing electronics 250 msec or longer to complete the transaction. However, if the print head requires a certain printing speed such as that required by an inkjet print head to achieve a certain resolution, reducing the envelope speed is not an option. Furthermore, reducing the envelope speed increases the time for the envelope to be ejected after printing, and the transport time in general. That could substantially reduce the efficiency, or the throughput, of the postage meter.

Another solution could be to redesign the processing electronics to accommodate the shorter transport device by completing its operations within the allowed time frame. However, this adds greatly to the overall cost of the postage meter because increased performance typically is achieved by migrating to higher speed microprocessors at increased cost.

It is desirable to have a high efficiency postage metering system in which the envelopes are transported through the print zone at a speed required by the desired throughput characteristics and in which there is sufficient time allowed for the processing means to complete the transaction before the envelope enters the print zone.

SUMMARY OF THE INVENTION

The present invention provides a method and a device for improving the efficiency of a postage meter wherein the envelopes are transported in a controlled fashion, so as to allow data processing means to have sufficient time to complete a transaction without reducing the envelope speed in the print zone. The method, according to the present invention, uses a multi-speed profile to match the time requirement of different components of a postage meter. With such a multi-speed profile, the envelope can be transported at a lower speed near the input end to allow the processing electronics to complete the transaction and then the envelope is accelerated to the required printing speed before the envelope is in the print zone. Advantageously, the envelope may be caused to pause at a location between the input end and the print zone to wait for the completion of the transaction.

The improved method as discussed hereinabove is made possible by a transport device, according to the present invention. As a part of the improved postage metering system, the transport device includes means for transporting an envelope from the input end of the postage metering system to the print zone for printing, and transporting the envelope from the print zone to the exit end after printing. The transport device further includes means for controlling the motion of the transporting means in accordance with a multi-speed profile so as to allow sufficient time for the processing electronics to complete the transaction prior to transporting the envelope into the print zone. The multi-speed profile is also designed such that the envelope is transported through the print zone at a speed required by or compatible with the characteristics of the print head. The transport device further includes means for sensing at least one edge of the incoming envelope so as to initiate the multi-speed profile.

With the transport device as discussed above, the method of improving the efficiency of a postage meter can be implemented, which in includes the steps of:

1) sensing at least one edge of the envelope; and 2) controlling the speed of the envelope responsive to said sensing and in accordance with a multi-speed profile so as to allow sufficient time for the data processing means to process mail related data and to provide the mail related data to the print head before or at the time the envelope enters the print zone. Preferably, the multi-speed profile includes a deceleration of the envelope prior to the mail related data being provided to the print head, and an acceleration of the envelope to the required speed prior to the envelope entering the print zone and the printing by the print head. The speed of the envelope prior to the deceleration is, preferably, smaller than or equal to the required speed in the print zone. But it can be greater than the required print zone speed, if so desired. Furthermore, the multi-speed profile may include a pause period after the deceleration.

The method and device for improving the efficiency of a postage meter will become apparent upon reading the drawings and the accompanying description.

BRIEF DESCRIPTION OF THE DRAWINGS

FIG. 3 through FIG. 7 are exemplar multi-speed profiles, according to the method of improving the efficiency of a postage metering system.

DETAILED DESCRIPTION

Figure 1:
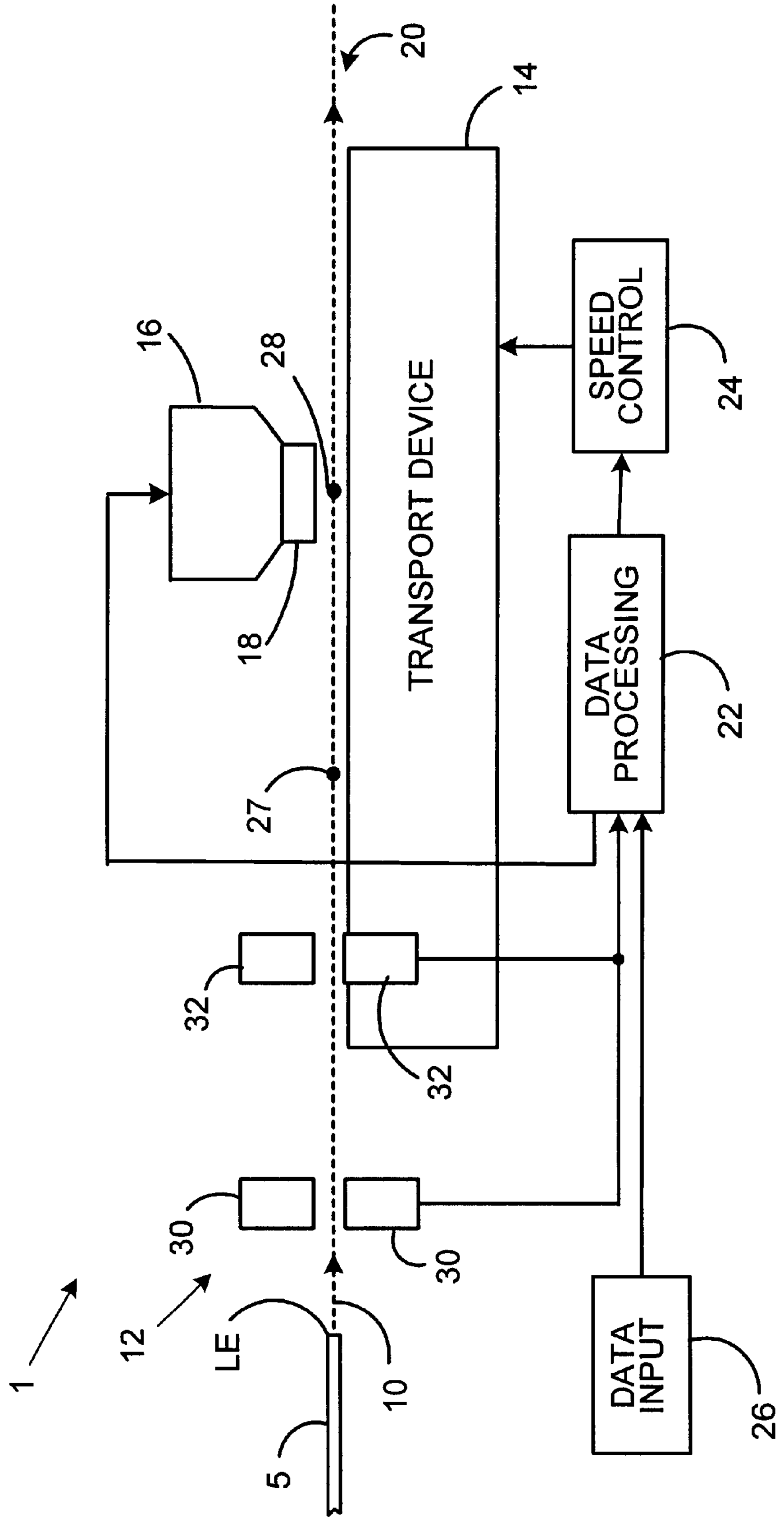
FIG. 1 illustrates a simplified schematic of the relevant components in a postage meter, according to the present invention.

FIG. 1 illustrates the relevant components in a postage meter 1, according to the present invention. In FIG. 1, reference numeral 10 denotes a path of travel along which an envelope 5 is fed as indicated by the arrows and transported through the postage meter 1. Reference numeral 12 denotes the input end of the postage meter 1 while reference numeral 20 denotes the exit end of the meter 1. Once the envelope 5 is fed through the input end 12, it is transported by transport device 14 which is controlled by speed controlling means 24. After the envelope 5 reaches a print zone 28, a print head 18 in a print head assembly 16 prints an indicia (not shown) on the envelope 5. However, prior to printing, the postage meter 1 must complete a transaction such that a data processing means 22 (such as any suitable combination of computer hardware components and software) is used to collect transaction parameters such as date, postage, piece count, postage meter serial number and other pertinent mail related information. Processing means 22 also uses an encryption process to generate encryption numbers unique to the envelope 5 and then provides data to the print head 18. The postage meter 1 also includes sensing means 30 (such as a through beam optical sensor or other device to detect the presence of the envelope 5) to sense at least one edge of an incoming envelope 5, a data input means 26 to allow a customer to enter messages, a service selection, or other mail related data. Preferably, processing means 22 is programmed to carry out a multi-speed profile, responsive to the sensing of the incoming envelope 5, so as to control the transport speed of the envelope 5 through different sections of the path 10.

Figure 2:
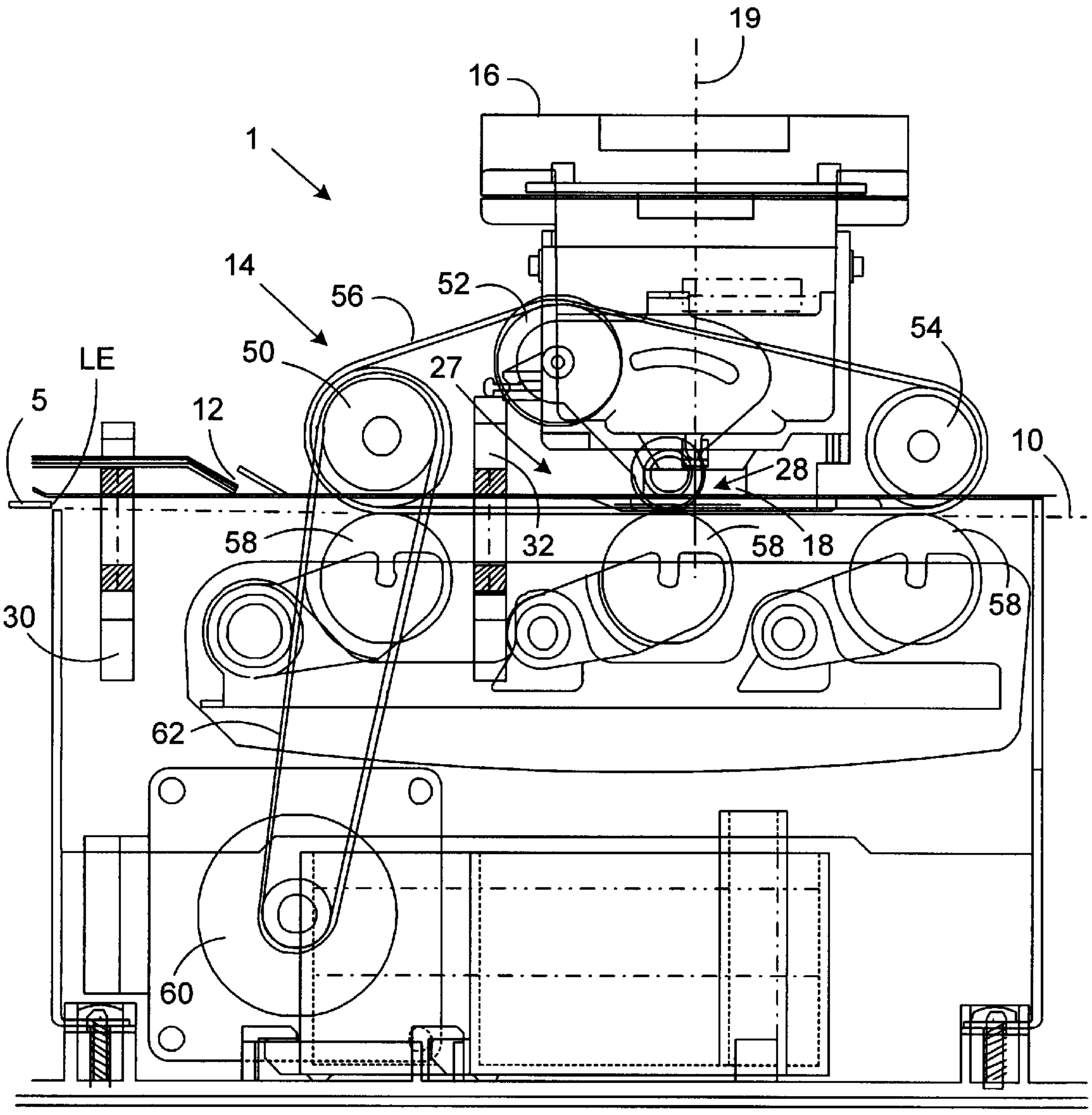
FIG. 2 illustrates in greater detail the transport device, according to the present invention.

FIG. 2 illustrates in detail the transport device 14 according to the present invention, along with a print head assembly 16 in a typical postage meter 1. As shown, a print head assembly 16 includes a print head 18 for printing an indicia and other optional messages on the envelope 5. It is preferable to use an inkjet print head or other type of print head to print one or more lines of dots at a time along the print line 19 while the envelope 5 is transported at a constant speed through the print zone 28. The transport device 14 includes pulleys 50, 52, 54 to support and move a transport belt 56. The transport device 14 further includes a plurality of idler rollers 58 for biasing the envelope 5 upward into contact with the transport belt 56. Pulley 50 is driven by a transport motor 60 and a belt 62. Unique to this transport device 14 is the placement of means for sensing the edges of the envelope 5. As shown, an input sensor 30 is located just upstream of the transport device 14 and acts as an envelope detector to start the transport device 14 upon detection of a leading edge LE of the envelope 5 as an operator inserts the envelope 5 into the meter 1 for processing. It is also used as the initiator of system timing, on both an initial and subsequent envelopes 5 when envelopes 5 are fed in a stack. The timing from the input sensor 30 to the input 12 of the transport, usually cannot be predicted very accurately, since it depends on the speed of insertion by the operator. But once the envelope 5 is under the control of the transport device 14, its movement and timing are highly predictable. As such, the timing as shown in FIGS. 3 to 7 starts approximately at the input 12 of the transport device 14, with the time interval for the envelope 5 to move from sensor 30 to the input 12 of the transport device 14 assumed to be zero or insignificant. Another path sensor 32 is located after the transport input 12, but before the print zone 28. Here the print zone 28 is defined by a point in transport path 10 at which the leading edge LE of the envelope 5 must reach before the print head starting the printing process. Path sensors 30 and 32 can have multiple functions to sense the envelope 5 prior to printing, such as:

A) Skew detector—it is preferable to locate both sensor 30 and 32 near the registration wall (not shown) of the postage meter. It is assumed that the operator will place the envelope 5 into the meter 1 with a top edge (not shown) of the envelope 5 up against this rear registration wall. On occasion, the operator may place the envelope 5 into the meter 1 such that the upper right hand front corner (defined as the intersection of the leading edge and the top edge) is touching the registration wall, but the back end (defined as the intersection of a trailing edge and the top edge) of the envelope 5 is away from the registration wall. This condition is called skew. In this situation, sensor 30 will initially detect the envelope 5. But as the envelope 5 proceeds into the transport device 14, the rear end of the envelope will not be detected by sensor 30, since it is too far from the registration wall. The distance between sensor 30 and sensor 32 is, preferably, shorter than the shortest envelope 5 the meter 1 will process. Since the geometry of the sensors 30 and 32 is known, the condition of the envelope 5 can be determined. For example, if sensor 32 is active (i.e. detecting the leading edge of the envelope), and sensor 30, which was active when the initial leading edge of the envelope was sensed, is not active (i.e. not sensing the trailing edge of the same enveloped), then the envelope 5 is either too short or it is skewed. In this case, the meter 1 provides a special handling procedure to eject the envelope 5 and not print and terminate the transaction.

B) Jam detector—If sensor 30 has been activated and sensor 32 does not see the envelope 5 within a reasonable time interval, then the transaction is terminated.

C) Stopping point—The distance from sensor 32 to the print zone 28 is so designed that the envelope 5 when it reaches sensor 32 can be stopped at a dwell point 27 located a predetermined distance upstream from the print head 18 with a reasonable deceleration, held for a determined interval, and then accelerated at a reasonable level to the required print speed. Having such a dwell point 27 relative to the location of sensor 32, the transport device 14 does not need a mechanical item such as an obstruction surface or a pin to halt the movement of an envelope. In contrast, the leading edge LE of the envelope 5 is stopped at the dwell point 27 by stopping the transport motor 60. This stopping method has an advantage over a mechanical obstruction means as it avoids causing damages to the envelope 5 in crash stopping.

With the structural aspects of the present invention described as above, the operational features will now be described in view of FIG. 1 and FIG. 2. Generally, the postage meter 1 remains at idle until the operator begins a transaction. After the desired postage amount is established, the operator hand feeds the envelope 5 into the postage meter 1. Once the lead edge LE of the envelope 5 is detected by the sensor 30, the data processor 22 initiates operation of the transport device 14. Eventually, as the operator continues to advance the envelope 5, the lead edge LE will be captured between the nip of the transport belt 56 and the idler rollers 58. Once this occurs, the transport device 14 controls the advance of the envelope 5 and the operator may let go of it. The transport device 14 continues to feed the envelope 5 in the path 10 until the lead edge LE is detected by sensor 32. Once this occurs, the transport device 14 brings the envelope 5 to rest so that the lead edge LE is at the dwell point 27. The envelope 5 rests here until the data processor collects the input information, performs its calculations and is ready to commence a print cycle. Once the data processor completes these tasks, the transport device 14 brings the envelope 5 up to print speed feeding it through the print zone 28 so that the print head 18 may print the postal indicia on the envelope 5. After printing, the transport device 14 continues to advance the envelope 5. After the sensor 32 detects the trail edge of the envelope 5, the transport device 14 continues to operate for a predetermined length of time before returning to idle state to ensure that the envelope 5 is properly ejected from the meter 1.

Alternatively, the data processor 22 may commence bringing the envelope 5 up to print speed prior to being ready to commence a print cycle. Here, the data processor 22 knows a ramp time required to bring the envelope 5 up to print speed from rest and may begin this activity when an estimate of the time remaining to complete processing is within the ramp time and allowing for a suitable margin of safety.

Since different operators will insert the envelope 5 into the meter 1 at different speeds, the exact location of the lead edge LE is not known until the sensor 32 detects the lead edge LE. However, since the lead edge LE cannot reach the sensor 32 until the envelope 5 is under the positive control of the transport device 14, the lead edge LE may be brought to the dwell point 27 in a controller manner, repeatably. Thus, the actual print cycle is commenced from a predefined location for each envelope 5.

FIG. 3 through FIG. 7 are exemplar multi-speed profiles for improving the efficiency of a postage metering system. Referring to FIG. 3 through FIG. 7 in view of the structure of FIG. 1 and FIG. 2, LE, TE represent, respectively, the leading edge and trailing edge of the envelope. S2 is sensor 32 and PH means print head. FIG. 3 illustrates a first preferred speed profile of the transport device 14 when a single envelope 5 is fed by the operator. Here the print zone speed of the envelope is 508 mm/sec, matching the characteristics of a certain print head 18. But the speed can be changed, if so required, when another print head 18 is used. As shown, the transport speed of the envelope 5 from the input to the dwell point 27 is lower. The envelope 5 also stops for a period of time to allow a total of about 260 msec for the meter 1 to complete a transaction. With an envelope of 241 mm long, the entire process, from envelope entering to envelope exiting is completed within 1 second. However, if the data processor 22 is slow and requires more time to complete the transaction, the stopping period can be extended to meet the requirement. In this mode of operation, the throughput of the meter 1 is about 65 envelopes per minute.

As shown in FIG. 4, a second speed profile is shown for a single envelope 5 where the dwell time has been extended because the data processor 22 requires additional time to complete its tasks either because of normal variances in processing times or because the data processor 22 is designed to be more cost effective and of reduced performance. Here, the data processor 22 is allowed to have about 560 msec to complete the transaction. In this mode of operation, where increased processing time is required, the throughput of the meter 1 is about 49 envelopes per minute.

When the envelope 5 is fed by an operator, it is preferred that the input speed started by the transport device 14 be reasonably slow so as not to abruptly snap the envelope 5 out of the operator's hand. However, the speed should not be too low because then there may be a perception of the operator that the meter 1 has a low throughput. The input speed, as shown in the first and second speed profiles, is about 250 mm/sec (roughly one half of the print speed) and is independent of how fast or slow an operator inserts the envelope 5.

FIG. 5 illustrates a third speed profile of the transport device 14 when successive envelopes 5 are fed by the operator. This profile is utilized a second envelope 5 is placed into the input 12 of the transport device 14 while the first envelope **5*a* is still in the transport device 14 and in the meter 1 when the data processor 22 has increased performance characteristics. For example, this may occur while the first envelope 5 is still being printed upon or ejected. As shown, the second envelope 5 is transported from the input 12 to the dwell point at a higher speed, at 508 mm/sec because the transport device 14 is still operating the print/eject speed due to the first envelope 5. This is because the same transport device 14 is used to eject the first envelope 5 and to take in the second envelope 5. Furthermore, it is desirable to eject the envelope 5 at a highest speed of the system. With about 200 msec being allowed for the completion of a transaction, the throughput of the meter 1** is about 84 envelopes per minute in this mode of operation.

FIG. 6 illustrates a forth speed profile of the transport device when successive envelopes 5 are fed in the postage meter 1 and the input speed is equal to the print speed. The throughput of the meter is about 59 envelopes per minute.

A further advantage of the method of transporting items in a postage meter 1 in accordance with a multi-speed profile is that the profile can also be designed for the dispensing of metered indicia tape labels for parcels, flats and packages. As shown in FIG. 7, the speed profile is different from those shown in FIGS. 3–6. However, the same requirement for the completion of the encryption transaction prior to the printing of the indicia label applies.

In the postage meter/mailing machine market, overall throughput (number of envelopes processed per minute) is one of the most important model differentiators. The present invention makes it possible to build a family of mailing machines with varying throughput rates, by using the same hardware and simply changing the delay time in the transport device 14 in software, without affecting any critical parameters such as motor acceleration and deceleration rates, speeds, print resolution, and so forth.

Also, by tailoring the design of the data processor 22, the manufacturer can adapt the cost and performance of the meter 1 to the requirements of the customers. Therefore, increased flexibility in meter 1 functionality and reduced development time are achieved because a unique data processor 22 (control system) is not required for each entry in the postage meter family. That is, the flexibility may be provided for in software so that the data processor 22 is in effect adaptive.

It should be noted that the drawing figures and the speed profiles are for illustrative purposes only. Although the invention has been described with respect to a preferred version and embodiment thereof, it will be understood by those skilled in the art that the foregoing and various other changes, omissions and deviations in the form and detail thereof may be made without departing from the spirit and scope of this invention.

What is claimed is:

1. A method of processing an envelope in a postage metering system, comprising the step(s) of:

receiving a lead edge of the envelope at an input nip of a transport device;

feeding the envelope in a downstream path of travel in accordance with a multi-speed profile;

detecting the lead edge of the envelope at a position downstream in the path of travel from the input nip and upstream in the path of travel from a print zone;

processing mail related data corresponding to the envelope, the mail related data including an encrypted message necessary to generate a postal indicia;

downloading print data corresponding to the postal indicia to a print head for printing the postal indicia on the envelope; and controlling the multi-speed profile so as to allow sufficient time, during which the envelope travels from the position to the print zone, for the processing of mail related data and the downloading of print data so that the postal indicia may be properly printed on the envelope.

2. The method claim 1, further comprising the step(s) of:

controlling the feeding of the envelope so that:

the lead edge of the envelope comes to a stop at a dwell point located downstream in the path of travel from the position and upstream in the path of travel from the print zone;

the envelope experiences a controllable dwell time period while the lead edge of the envelope is at the dwell point; and following the dwell time period, the envelope is accelerated to a constant speed during printing.

3. The method claim 2, further comprising the step(s) of:

estimating an amount of time remaining for processing mail related data and downloading print data; and initiating feeding of the envelope from the dwell point when the amount of time remaining is within a ramp time required to bring the envelope to the print zone.

4. The method claim 3, further comprising the step(s) of:

detecting the lead edge of the envelope at an other position upstream in the path of travel from the input nip; and activating the transport device after detecting the lead edge at the other position.

5. The method according to claim 1, wherein the multi-speed profile includes a deceleration of the envelope prior to the downloading of print data to the print head.

6. The method according to claim 5, wherein the multi-speed profile includes a pause period after the deceleration.

7. The method according to claim 5, wherein the multi-speed profile includes an acceleration of the envelope to a first speed prior to printing the postal indicia on the envelope.

8. The method according to claim 7, wherein the multi-speed profile includes a second speed for the envelope to be transported prior to the deceleration, the second speed being less than the first speed.

9. A postage metering system comprising:

a transport device having an input nip, the transport device feeding an envelope in a downstream path of travel from the input nip in accordance with a multi-speed profile;

a processor to process mail related data corresponding to the envelope, the mail related data including an encrypted message necessary to generate a postal indicia;

a sensor for sensing a lead edge of the envelope at a first position downstream in the path of travel from the input nip and upstream in the path of travel from a print zone; and a print head for printing the postal indicia on the envelope in the print zone, the print head receiving print data corresponding to the postal indicia, wherein the multi-speed profile is controlled so as to allow sufficient time, during which the envelope travels from the first position to the print zone, for the processing of the mail related data and downloading of the print data so that the postal indicia may be properly printed on the envelope.

10. The system according to claim 9, further comprising:

a speed control device coupled to the processor and the transport device to control the multi-speed profile.

11. The system according to claim 9, further comprising:

a second position located downstream in the path of travel from the first position and upstream in the path of travel from the print zone, wherein the envelope comes to a stop when the lead edge of the envelope reaches the second position for a controllable dwell time period and following the dwell time period the envelope is accelerated to a constant speed during printing.

12. The system according to claim 11, wherein the processor estimates an amount of time remaining for processing the mail related data and downloading the print data and initiates feeding of the envelope from the second position when the amount of time remaining is within a ramp time required to move the envelope from the second position to the print zone.

13. The system according to claim 9, further comprising:

a second sensor located at a position upstream in the path of travel from the input nip, wherein the transport device is activated after the second sensor senses the lead edge of the envelope.

14. The system according to claim 9, wherein the multi-speed profile includes a deceleration of the envelope prior to the downloading of print data to the print head.

15. The system according to claim 14, wherein the multi-speed profile includes a pause period after the deceleration.

16. The system according to claim 14, wherein the multi-speed profile includes an acceleration of the envelope to a first speed prior to printing the postal indicia on the envelope.

17. The system according to claim 16, wherein the multi-speed profile includes a second speed for the envelope to be transported prior to the deceleration, the second speed being less than the first speed.

* * * * *